(12) United States Patent
Peng et al.

(10) Patent No.: US 12,200,545 B2
(45) Date of Patent: Jan. 14, 2025

(54) RESOURCE SELECTION METHOD AND TERMINAL

(71) Applicant: VIVO MOBILE COMMUNICATION CO., LTD., Dongguan (CN)

(72) Inventors: Shuyan Peng, Dongguan (CN); Zichao Ji, Dongguan (CN); Wei Jiang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 280 days.

(21) Appl. No.: 17/866,439

(22) Filed: Jul. 15, 2022

(65) Prior Publication Data

US 2022/0353747 A1 Nov. 3, 2022

Related U.S. Application Data

(63) Continuation of application No. PCT/CN2021/071446, filed on Jan. 13, 2021.

(30) Foreign Application Priority Data

Jan. 20, 2020 (CN) .......................... 202010066637.6

(51) Int. Cl.
*H04W 28/26* (2009.01)
*H04L 1/1812* (2023.01)
*H04L 1/1867* (2023.01)

(52) U.S. Cl.
CPC ........... *H04W 28/26* (2013.01); *H04L 1/1812* (2013.01); *H04L 1/189* (2013.01)

(58) Field of Classification Search
CPC ....... H04W 28/26; H04L 1/1812; H04L 1/189
See application file for complete search history.

(56) References Cited

U.S. PATENT DOCUMENTS

| | | | |
|---|---|---|---|
| 2015/0016309 A1* | 1/2015 | Fang | H04W 74/0808 |
| | | | 370/277 |
| 2018/0279275 A1 | 9/2018 | Chen et al. | |
| 2020/0008183 A1 | 1/2020 | Chen et al. | |
| 2021/0266912 A1* | 8/2021 | Ma | H04L 1/189 |
| 2021/0336728 A1* | 10/2021 | Selvanesan | H04L 1/1861 |
| 2022/0078761 A1* | 3/2022 | Kim | H04W 28/0252 |
| 2022/0417867 A1* | 12/2022 | Yoshioka | H04W 52/325 |

FOREIGN PATENT DOCUMENTS

| | | | |
|---|---|---|---|
| CN | 108632781 A | 10/2018 | |
| CN | 108702758 A | 10/2018 | |
| CN | 110248412 A | 9/2019 | |

(Continued)

OTHER PUBLICATIONS

Second Office Action issued in related Chinese Application No. 202010066637.6, mailed Jul. 18, 2022, 11 pages.

(Continued)

*Primary Examiner* — Michael Thier
*Assistant Examiner* — Nevena Zecevic Sandhu
(74) *Attorney, Agent, or Firm* — IPX PLLC

(57) ABSTRACT

A resource selection method and a terminal are provided. The resource selection method includes: when a target SCI indicates resource reservation, performing resource reservation or resource sensing based on resource reservation rule information.

18 Claims, 5 Drawing Sheets

(56) References Cited

FOREIGN PATENT DOCUMENTS

| CN | 110401933 A | 11/2019 |
|---|---|---|
| CN | 110545524 A | 12/2019 |
| CN | 112584509 A | 3/2021 |
| WO | 2018082073 A1 | 5/2018 |

OTHER PUBLICATIONS

Vivo, "Discussion on mode 2 resource allocation mechanism" 3GPP TSG RAN WG1 Meeting#98bis, R1-1911420, Oct. 2019, 14 pages.
Third Office Action issued in related Chinese Application No. 202010066637.6, mailed Nov. 8, 2022, 6 pages.
NEC, "Mode 2 resource allocation mechanism for NR sidelink" 3GPP TSG RAN WG1 Meeting#97, R1-1906392, May 2019, 4 pages.
International Search Report issued in corresponding International Application No. PCT/CN2021/071446, mailed Mar. 21, 2021, 6 pages.
ZTE, "Mode 2 resource allocation schemes on sidelink", 3GPP TSG RAN WG1 #97 R1-1907130, May 2019, sections 2-4.
First Office Action issued in related Chinese Application No. 202010066637.6 , mailed Jan. 20, 2022, 8 pages.
Huawei et al., "Sidelink resource allocation mode 2 for NR V2X" 3GPP TSG RAN WG1 Meeting#98bis, R1-1910056, Oct. 2019.
Ericsson, "Resource allocation for Mode-2 transmissions", 3GPP TSG RAN WG1 Meeting#97, R1-1907136, May 2019.

\* cited by examiner

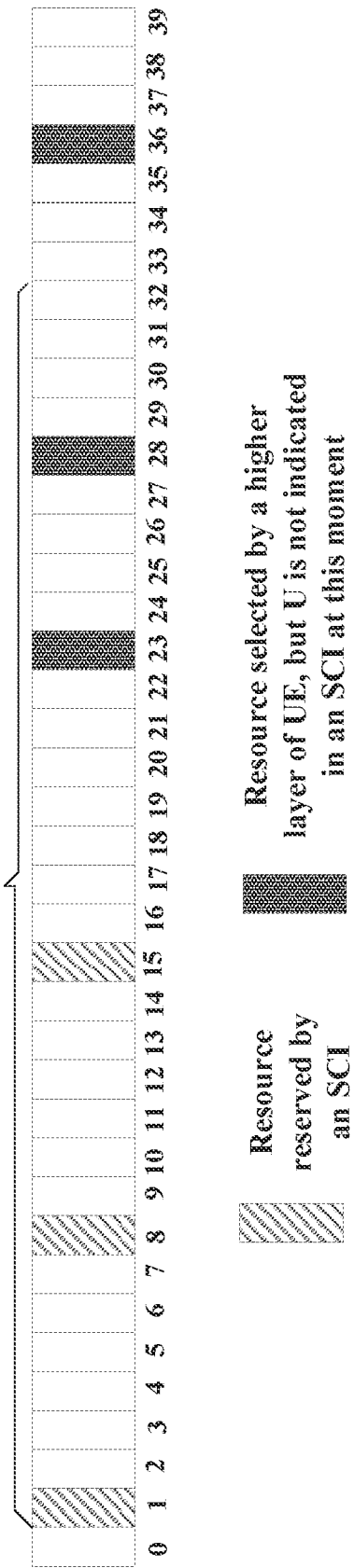
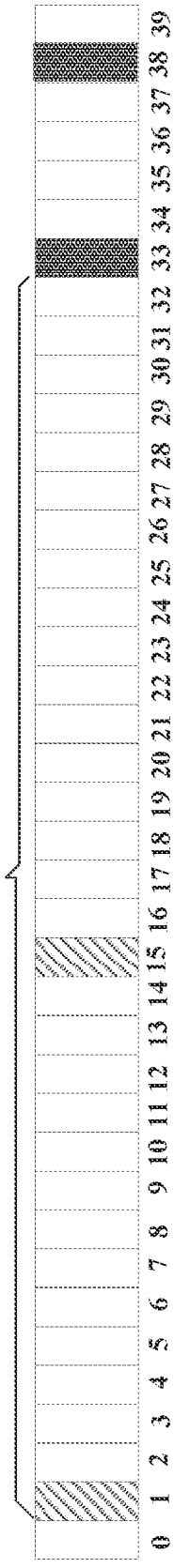
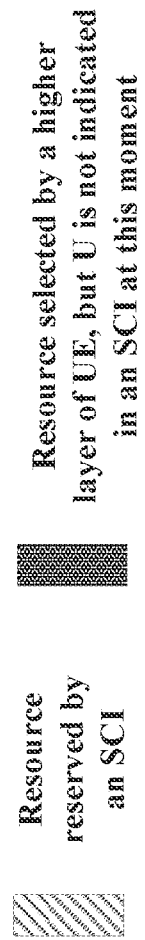
FIG. 3
FIG. 4

RESOURCE SELECTION METHOD AND TERMINAL

CROSS-REFERENCE TO RELATED APPLICATIONS

This application is a continuation of International Application No. PCT/CN2021/071446, filed Jan. 13, 2021, which claims priority to Chinese Patent Application No. 202010066637.6 filed Jan. 20, 2020. The entire contents of each of the above-referenced applications are expressly incorporated herein by reference.

TECHNICAL FIELD

Embodiments of the present disclosure relate to the field of wireless communications technologies, and in particular, to a resource selection method and a terminal.

BACKGROUND

A Long Term Evolution (LTE) system supports a sidelink since the release of version 12, and is used for direct data transmission between User Equipment (UE, hereinafter referred to as a terminal for short) without using a network device.

Design of an LTE sidelink is applicable to specific public security matter communication (such as emergency communication at a fire place or a disaster place such as an earthquake) or vehicle to everything (V2X) communication. The vehicle to everything communication includes various services such as basic security type communication, advanced (automatic) driving, formation, and sensor extension. Because the LTE sidelink supports only broadcast communication, it is mainly used for basic security type communication, and other advanced V2X services that have a strict Quality of Service (QoS) requirement in terms of delay and reliability are supported by using a New Radio (NR) sidelink.

Currently, a resource reservation mechanism in a sidelink system is defined, but a specific resource reservation rule is not defined. If no resource reservation rule is defined, different terminals may have different understandings during sensing, so that resources are inaccurately ruled out when resource selection, thereby causing a problem of resource collision.

SUMMARY

According to a first aspect, an embodiment of the present disclosure provides a resource selection method, applied to a terminal and including:
  if a target SCI indicates resource reservation, performing resource reservation or resource sensing based on resource reservation rule information.

According to a second aspect, an embodiment of the present disclosure provides a terminal, including: a processing module, configured to: if a target SCI indicates resource reservation, perform resource reservation or resource sensing based on resource reservation rule information.

According to a third aspect, an embodiment of the present disclosure provides a terminal, including a processor, a memory, and a computer program that is stored in the memory and that can run on the processor, and when the computer program is executed by the processor, steps of the resource selection method in the first aspect are implemented.

According to a fourth aspect, an embodiment of the present disclosure provides a computer-readable storage medium, where the computer-readable storage medium stores a computer program, and when the computer program is executed by a processor, steps of the resource selection method in the first aspect are implemented.

BRIEF DESCRIPTION OF DRAWINGS

The accompanying drawings are merely used to show the exemplary implementations, and are not considered as limitations to the present disclosure. In addition, in the entire accompanying drawings, same reference numerals are used to indicate the same component. In the accompanying drawings:

FIG. 3 is a schematic diagram of a resource selection method according to an embodiment of the present disclosure;

FIG. 4 is a schematic diagram of a resource selection method according to an embodiment of the present disclosure;

DETAILED DESCRIPTION

The term "include" and any modification thereof in the specification and claims of this application are intended to cover non-exclusive inclusion, for example, processes, methods, systems, products, or devices that contain a series of steps or units are not necessarily limited to those steps or units that are clearly listed, but may include other steps or units that are not clearly listed or are inherent to these processes, methods, products, or devices. In addition, "and/or" is used in the specification and claims to indicate at least one of connected objects, for example, A and/or B indicates three cases: only A exists, only B exists, and both A and B exist.

In the embodiments of the present disclosure, words such as "exemplary" or "for example" are used to indicate an example, an instance, or descriptions. Any embodiment or design scheme described as "exemplary" or "an example" in the embodiments of the present disclosure should not be construed as being preferable or advantageous than other embodiments or design schemes. Specifically, the words such as "exemplary" or "for example" are used to present related concepts in a specific manner.

The embodiments of the present disclosure are described below with reference to the accompanying drawings.

Figures 1, 2:
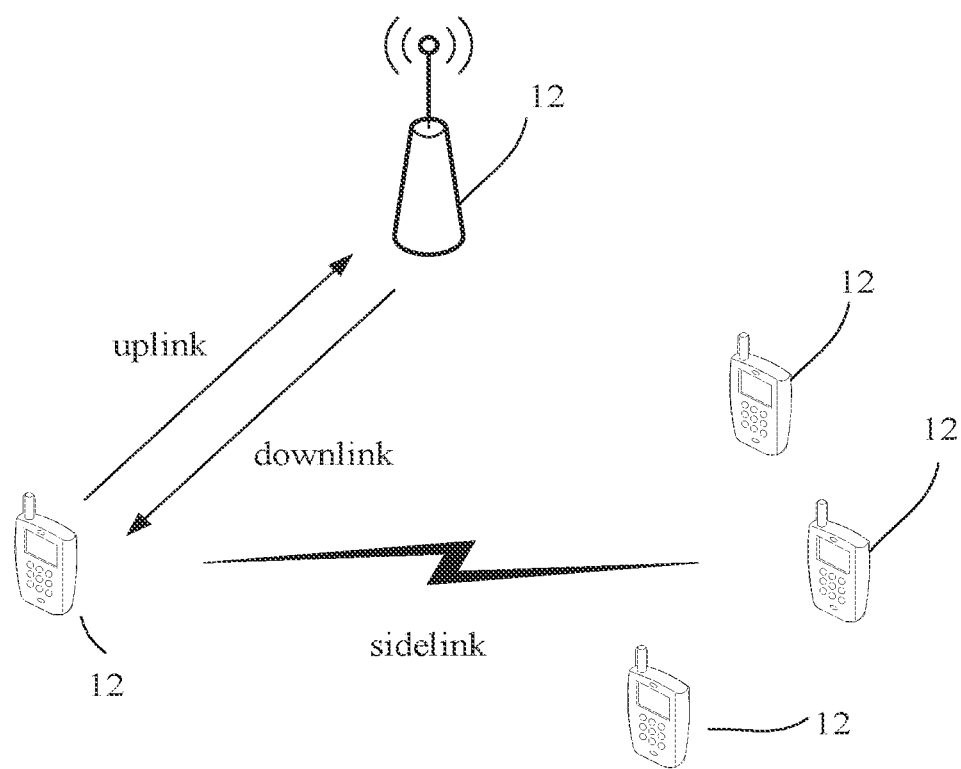
FIG. 1 is a schematic architectural diagram of a wireless communications system according to an embodiment of the present disclosure.
FIG. 2 is a schematic flowchart of a resource selection method according to an embodiment of the present disclosure.

FIG. 1 is a schematic architectural diagram of a wireless communications system according to an embodiment of the present disclosure. As shown in FIG. 1, the wireless communications system may include a network side device 11 and multiple terminals 12. The terminals 12 may be connected to the network side device 11 by using uplink and downlink links, and the terminals 12 may be connected by using a sidelink.

This embodiment of the present disclosure is mainly applied to a scenario in which terminals communicate by using a sidelink.

The terminal 12 provided in this embodiment of the present disclosure may be a mobile phone, a tablet computer, a notebook computer, an Ultra-Mobile Personal Computer (UMPC), a netbook, a Personal Digital Assistant (PDA), a vehicle, a roadside unit (RSU), or the like. A person skilled in the art may understand that the use of words does not constitute a limitation.

Refer to FIG. 2. FIG. 2 shows a resource selection method provided in an embodiment of the present disclosure. The resource selection method is applied to a terminal and includes:

Step 21: If target Sidelink Control Information (SCI) indicates resource reservation, perform resource reservation or resource sensing based on resource reservation rule information.

For one TB, resource reservation may be indicated by using an SCI. A maximum number of resources that can be reserved by an SCI is Nmax, and a maximum value of Nmax is 3. Nmax is a value that can be configured for each resource pool. In some embodiments, value is 2 or 3. Further, a number of transmission times of one TB in mode 1 is not limited, and depends on the scheduling of a base station. A maximum of transmission times of one TB (including a blind retransmission mode and a HARQ-based retransmission mode) is 32 in mode 2), and is specifically a value configured by RRC. The RRC configures a maximum number of transmission times based on each resource pool, each Channel Busy Ratio (CBR) range, and each priority.

In this embodiment of the present disclosure, the target SCI is an SCI associated with transmission of a current TB. The reserved resource may be used for transmission of the current TB, or may be used for transmission of another TB.

In this embodiment of the present disclosure, the resource reservation rule information may be predefined, preconfigured, configured, or indicated by the target SCI.

In this embodiment of the present disclosure, the terminal can keep consistent understanding of information based on the reservation resource rule information, and perform resource reservation or resource sensing, so that when selecting a resource, another terminal can accurately rule out a reserved resource, thereby avoiding a problem of a resource collision, so that data transmission reliability of the terminal can be improved.

The following describes specific content of the resource reservation rule information.

1. The resource reservation rule information includes at least one of the following:

N, where N is a number of reserved resource times or a number of reserved time domain units; or L, where L is a number of reserved resources or a number of reserved HARQ processes.

In this embodiment of the present disclosure, the terminal may reserve, in a remaining Packet Delay Budget (PDB), resources for N times of transmission or N time domain units for the TB, or L resources or L HARQ processes for the TB.

In this embodiment of the present disclosure, a value of N is one of the following:

a first value, where the first value is a maximum number of transmission times of a TB, the maximum number of transmission times of the TB minus a number of transmission times that the TB has completed, or a maximum number of transmission times of the TB minus a number of resources that have been selected for the TB;

a second value, where the second value is a maximum quantity Nmax of resources that can be reserved by an SCI, or Nmax minus a number of remaining reserved resources; and a smaller value in the first value and the second value; where the TB is a TB scheduled by the target SCI.

The number of resources that have been selected for the TB includes the number of transmission times that the TB has completed and a number of reserved resources (for the TB).

The following describes the concept of a number of remaining reserved resources.

For example, the maximum number of resources that can be reserved by an SCI is Nmax=3, three resources are reserved in the first time, and two resources remain after initial transmission. If reselection is triggered at a moment before next transmission, a number of remaining resources is 2, and one resource (Nmax−Number of remaining reserved resources) needs to be selected. In this way, in the next transmission, the SCI may indicate a slot in which the SC is located and three resources following the slot.

If reselection is triggered on the second resource reserved last time, only one resource (Nmax−Number of remaining reserved resources) needs to be selected, that is, the number of remaining reserved resources is 2. In this way, the SCI can indicate a slot in which the SCI is located and three resources following the slot.

In this embodiment of the present disclosure, the value of N is set by a transmit terminal of the target SCI. In other words, the terminal determines N, and a value range of N is as follows:

(1) [1, Maximum number of transmission times of the TB]; or [1, Maximum number of transmission times of the TB−Number of transmission times that the TB has completed]; or [Maximum number of transmission times of the TB−Number of resources that have been selected for the TB];

(2) [1, Nmax]; or [1, Nmax−Number of remaining reserved transmission times]; or (3) A union of a set in (1) and a set in (2).

In this embodiment of the present disclosure, values of N and/or L are predefined, preconfigured, or configured values.

In this embodiment of the present disclosure, N and/or L are/is set in the following manners:

each TB (per TB) corresponds to a respective N and/or L;

each terminal (per UE) corresponds to a respective N and/or L;

each priority (per priority) corresponds to a respective N and/or L;

each resource pool (Per resource pool) corresponds to a respective N and/or L;

each channel busy ratio (per CBR) corresponds to a respective N and/or L;

each channel occupation ratio (per CR) corresponds to a respective N and/or L;

each logical channel (per LCH) corresponds to a respective N and/or L; and each logical channel group (per LCH group) corresponds to a respective N and/or L.

Transmission of the TB can be divided into initial transmission and retransmission of the TB. The following describes resource selection and reservation manners in initial transmission and retransmission.

1. For Initial Transmission:

Currently, reserving a resource by an SCI of a currently transmitted TB for initial transmission of a subsequent TB is supported. In R16 V2X, resources can also be allocated for initial transmission based on a non-reserved manner. In other words, resources are allocated for initial transmission based on a detection and resource selection process.

2. For Retransmission:

In R16, two retransmission modes are supported: One is blind retransmission, and the other is HARQ feedback-based retransmission.

In blind retransmission, reservation of resources for retransmission is supported, and blind retransmission is: allocating multiple retransmission resources to the TB in advance, so that a transmit terminal (TX UE) retransmits the TB in all retransmission resources allocated to the TB in advance.

In the HARQ feedback-based retransmission mode, reservation of resources for retransmission is supported. HARQ feedback-based retransmission is an initial transmission for transmission of the TB on an initial transmission resource allocated to the TB. If a receive terminal successfully performs demodulation, an ACK is fed back, and the transmit terminal does not retransmit the TB. If the receive terminal fails to perform demodulation, a NACK is fed back, and the transmit terminal retransmits the TB on a retransmission resource allocated to the TB.

In this embodiment of the present disclosure, blind retransmission and HARQ feedback-based retransmission respectively correspond to one value of N; or a sum of a number of resource times or a number of time domain units reserved for blind retransmission and HARQ feedback-based retransmission is N.

Blind retransmission and HARQ feedback-based retransmission respectively correspond to one value of N; in other words, N is separately predefined, preconfigured, or configured for blind retransmission and HARQ feedback-based retransmission. Values of N corresponding to blind retransmission and HARQ feedback-based retransmission may be the same, or may be different.

In this embodiment of the present disclosure, blind retransmission and HARQ feedback-based retransmission respectively correspond to one value of L; or a sum of a number of resources or a number of HARQ processes reserved for blind retransmission and HARQ feedback-based retransmission is L.

Blind retransmission and HARQ feedback-based retransmission respectively correspond to one value of L; in other words, L is separately predefined, preconfigured, or configured for blind retransmission and HARQ feedback-based retransmission. Values of L corresponding to blind retransmission and HARQ feedback-based retransmission may be the same, or may be different.

In this embodiment of the present disclosure, a unit used by the quantity L of reserved resources is one of the following:

subchannel;

physical resource block (PRB);

resource element (RE), data rate; or data amount.

2. The resource reservation rule information includes locations of reserved resources.

In this embodiment of the present disclosure, the locations of the reserved resources meet at least one of the following conditions:

(1) The reserved resources are located in M time domain units and are not in one time domain unit.

(2) when next transmission is selected, a reserved resource and a reserved resource before the reserved resource are located in M time domain units, and are not in one time domain unit.

For example, N=Nmax=3, it is ensured that the third resource falls within a distance range of M time domain units (for example, M=32 slots) of preceding two selected resources.

(3) If periodic reservation is enabled, the reserved resources are within a resource reservation period of the TB.

(4) A time interval between resources reserved in two adjacent times is not less than Ml time domain units.

(5) A maximum of one resource is selected from [n−Nl, n] for reservation, and selected resources are not adjacent.

For example, if a PSFCH period N_FB configured in a resource pool configured for the terminal is not zero, a maximum of one resource is selected in each [n−N_FB+2−a, n] for reservation by using a slot n in which a PSFCH is located as a reference, and selected resources are not adjacent, where N is a number of transmission reservation times or a number of reserved time domain units, and a is a slot length required by the terminal to process one TB and send a feedback. That is, Nl=N_FB+2−a.

In this embodiment of the present disclosure, the time domain unit may be, for example, 32 slots.

In some embodiments, a value of Ml is one of the following:

a time length corresponding to $T_{proc, 0}$;

a time length corresponding to $T_{proc, 1}$;

a time length corresponding to $T_{proc, 0}+T_{proc, 1}$; or a predefined, preconfigured, or configured value; where a unit of the time length is millisecond, slot, micro-slot, subframe, or frame.

$T_{proc, 0}$ is related to detection time; and $T_{proc, 1}$ is related to packet sending preparation time.

In some embodiments, a value of a is one of the following.

a predefined, preconfigured, or configured value; where a time length corresponding to $T_{proc, 0}$;

a time length corresponding to $T_{proc, 1}$; or a time length corresponding to $T_{proc, 0}+T_{proc, 1}$; where a unit of the time length is millisecond, slot, micro-slot, subframe, or frame.

$T_{proc, 0}$ is related to detection time; and $T_{proc, 1}$ is related to packet sending preparation time; or vice versa, that is, $T_{proc, 0}$ is related to packet sending preparation time; and $T_{proc, 1}$ is related to detection time.

For example, if a is one slot, a maximum of one resource is selected on [n−N_FB+1, n].

In some embodiments, the locations of the reserved resources are a resource in which the target SCI is located and K consecutive selected resources subsequent to the resource, and the selected resource(s) are resources selected by higher layers.

In some embodiments, a value of K is equal to min (Nmax−1, Number of resources in M time domain units); where
Nmax is a maximum number of resources that can be reserved by an SCI.

In this embodiment of the present disclosure, a value of K is determined by the terminal.

3. The resource reservation rule information includes one of the following:
(1) If the TB uses blind retransmission and/or HARQ feedback-based retransmission, a number of reserved resource times of the TB does not exceed N.
(2) If the TB uses blind retransmission and/or HARQ feedback-based retransmission, the number of reserved resource times for the TB can exceed N. That is, the terminal may perform resource reselection, so that the number of reserved resource times exceeds N.

If there is no resource in the M time domain units, K=0. A value of K is equal to min(Nmax−1, Number of resources in M time domain units).

N is a number of reserved resource times or a number of reserved time domain units.

In this embodiment of the present disclosure, the performing resource reservation or resource sensing includes:
triggering the terminal to reserve a resource or triggering the terminal to perform resource sensing if at least one of the following conditions is met:
(1) A number of reserved transmission times is less than N, where N is a number of reserved resource times or a number of reserved time domain units.
(2) A number of reserved resources is less than L, where L is a number of reserved resources or HARQ processes.
(3) A number of reserved transmission times is less than or equal to $N_{selection}$, where $N_{selection}$ is a transmission times threshold for triggering resource selection.
(4) A proportion of a number of reserved transmission times is less than or equal to a %.
For example, a %=$N_{selection}$/N.
(5) A number of reserved resources is less than $L_{selection}$, where $L_{section}$ is a resource quantity threshold for triggering resource selection.
(6) A proportion of a number of reserved resources is less than or equal to b %.
For example, b %=$L_{selection}$/L.
(7) If the TB is still not successfully transmitted in time T before a moment of a (last but Ml−1)$^{th}$ selected resource.

For example, for unicast transmission, an ACK is not received or a NACK/DTX state is received; for opt1 based groupcast, a NACK is received; or for opt2 based groupcast, for one or more transmit terminals, an ACK is not received or a NACK/DTX state is received.

The opt1 based groupcast is a feedback mode for sending only a NACK, and the opt2 based groupcast is a mode for sending an ACK or a NACK.

Current sidelink transmission modes are mainly classified into broadcast, multicast, and unicast. Unicast means one-to-one transmission. Multicast is one-to-many transmission, and there may be multiple groups in a system. Broadcast is also one-to-many transmission, and there is only one group in a system.
(8) Whether the TB is successfully transmitted still cannot be determined at first T moments of a (last but Ml−1)$^{th}$ selected resource (for example, a corresponding PSFCH is after the moment);
(9) If a number of reserved transmission times is less than N at first T moments of last Ml selected resources, (for example, during blind retransmission, a corresponding number of blind retransmission times is not reached);
The T is a predefined, preconfigured, or configured value.
(10) If the last selected resource is transmitted but the TB is still not successfully transmitted;
(11) If the last selected resource is transmitted but whether the TB is successfully transmitted still cannot be determined;
(12) If the last selected resource is transmitted and a number of reserved transmission times is less than N.

The TB is a TB scheduled by the target SCI.

Ml is a value greater than or equal to 1 and less than N.

In some embodiments, any one or more of $N_{selection}$, a %, $L_{selection}$, b %, and M are predefined, preconfigured, or configured values.

In this embodiment of the present disclosure, a frequency domain resource and a time domain resource of a reserved resource meet at least one of the following:

A granularity of the time domain resource is: one slot, or 1 ms, or multiple predefined, configured, or preconfigured slots, or a maximum or minimum number of time domain resources in a single resource reserved for the currently transmitted TB.

A size of the frequency domain resource is a frequency domain resource size value obtained from a Resource indicator value (RIV), or an entire frequency domain resource of a resource pool, or a maximum or minimum number of frequency domain resources reserved for the currently transmitted TB.

A unit of the frequency domain resource is a Physical Resource Block (PRB) or a subchannel.

A reference location of the frequency domain resource is a start location of the frequency domain resource obtained from a resource indicator value indicated by the target SCI, or a lowest location of a lowest physical resource block or subchannel of a PSCCH, or a lowest location of a highest physical resource block or subchannel of a PSCCH, or n_offset resource elements by which a lowest or highest physical resource block of a PSCCH is offset, and n_offset resource elements by which a lowest or highest subchannel of a PSCCH is offset, where n_offset is a predefined or preconfigured value.

The following describes an example of a resource reservation method in an embodiment of the present disclosure with reference to a specific application scenario.

Embodiment 1 of the Present Disclosure

In a resource pool, a correspondence between a maximum number of reserved resources of a terminal and a channel busy ratio (CBR) and a priority is preconfigured. The terminal learns, based on a QoS parameter of a to-be-sent TB and the preconfigured correspondence, a maximum number of reserved resources of the TB is N=8.

At a moment n, if the number of reserved resources of the terminal is Nreserved.

If Nreserved≥N, no new resource is reserved.

If Nreserved<N, a new resource can be reserved.

The terminal may reserve additional N-Nreserved resources. At this moment, a number of resources reserved by the terminal is N.

Embodiment 2 of the Present Disclosure

A preconfigured maximum quantity N of reserved resources is equal to a maximum number of transmission times of each TB. For example, if a maximum number of transmission times of a currently transmitted TB is 8, N=8.

A network configures, for each resource pool, a maximum quantity Nmax=3 of resource times that can be reserved by an SCI.

At a moment n,
if a number of reserved resources of the terminal is Nreserved=10, Nreserved>N, and no new resource is reserved;
if the number of reserved resources of the terminal is Nreserved=5, Nreserved<N, Nreserved>Nmax, and no new resource is reserved; and
if the number of reserved resources of the terminal is Nreserved=1, Nreserved<Nmax, and the terminal may reserve Nmax-Nreserved=2 additional resources. At this moment, the number of reserved resources of the terminal is Nmax=3.

Embodiment 3 of the Present Disclosure

A maximum number of resources that can be reserved by a terminal is preconfigured as N=8.

A threshold Nselection for triggering the terminal to perform resource reservation is preconfigured as 3.

At a moment n,
when Nreserved≤Nselection, a new resource may be reserved, and a maximum number of reserved new resources is N-Nreserved resources.
Otherwise, no new resource is reserved.

Embodiment 4 of the Present Disclosure

Nmax=3 is configured by a higher layer. When the terminal performs resource selection through sensing, a resource reserved by an SCI at one time is a maximum of Nmax=3 (including a resource scheduled by the current SCI) resources closest to the SCI that are selected, in a window of 32 slots of a slot in which the SCI is located, from resources selected by a higher layer.

As shown in FIG. 3, before a slot 1, based on sensing/ re-evaluation, a higher layer of the terminal selects resources in slots 1, 8, 15, 23, 28, and 36. In the slot 1, an SCI indicates a maximum of three resources, and the SCI indicates three resources closest to the slot 1. Therefore, the SCI indicates resources in slots 1, 8, and 15.

Embodiment 5 of the Present Disclosure

Nmax=3 is configured by a higher layer. When the terminal performs resource selection through sensing, a resource reserved by an SCI at one time is a maximum of Nmax=3 (including a resource scheduled by the current SCI) resources closest to the SCI that are selected in a window of 32 slots of a slot in which the SCI is located.

As shown in FIG. 4, before a slot 1, based on sensing/ re-evaluation, a higher layer of a terminal selects resources in slots 1, 15, 33, and 38. In the slot 1, an SCI indicates three resources in a maximum of 32 slots, and only two resources are reserved in a window. Therefore, the SCI indicates two resources closest to the slot 1, and therefore, the SCI indicates resources in the slot 1 and 15.

Embodiment 6 of the Present Disclosure

Figure 5:
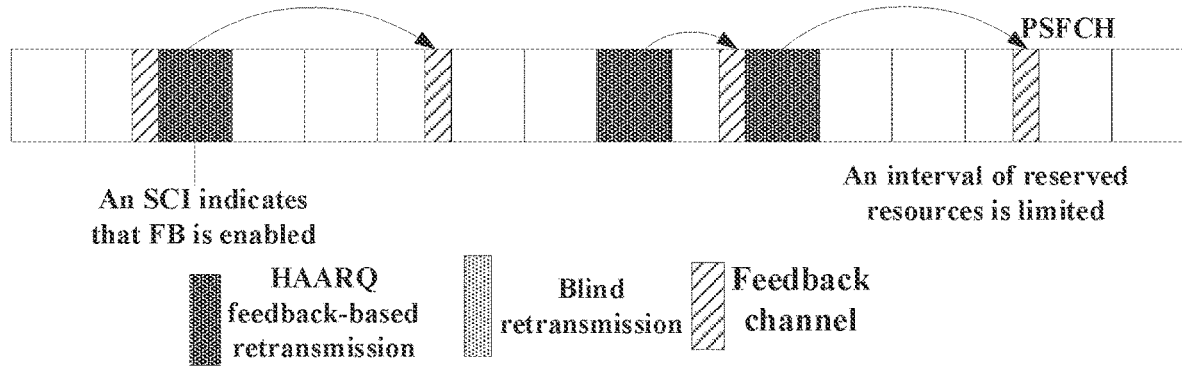
FIG. 5 is a schematic diagram of a resource selection method according to an embodiment of the present disclosure.

A PSFCH resource is configured in a resource pool, and the PSFCH resource appears once in every N=4 slots in the resource pool. If a slot n in which the PSFCH is located is used as a reference, the terminal selects a maximum of one resource in [n−3, n], and the two selected resources cannot be adjacent, as shown in FIG. 5.

Figure 6:
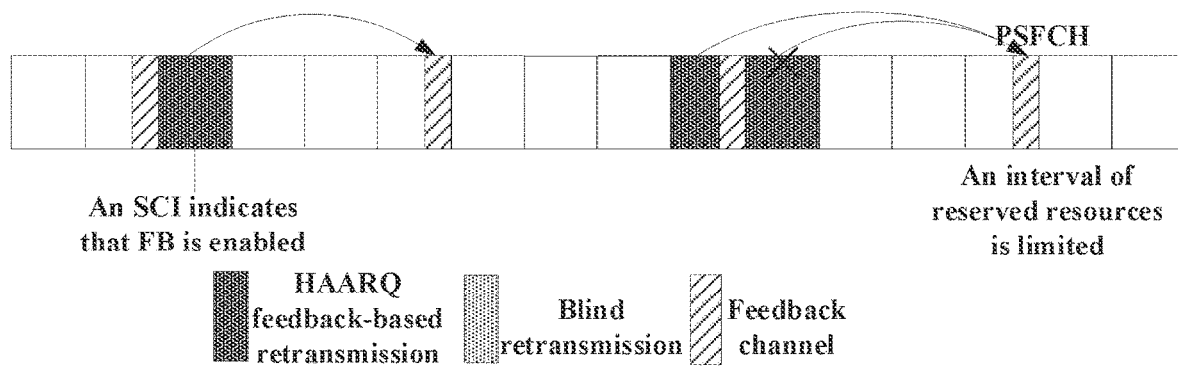
FIG. 6 is a schematic diagram of a resource selection method according to an embodiment of the present disclosure.
Figure 7:
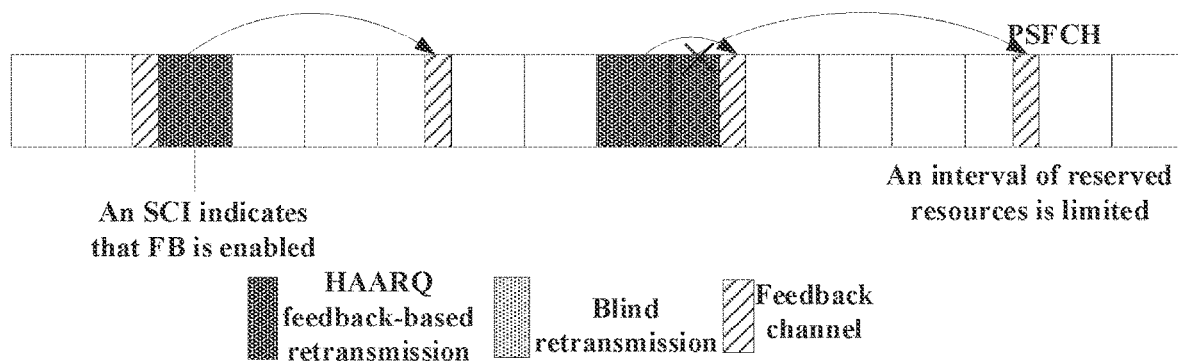
FIG. 7 is a schematic diagram of a resource selection method according to an embodiment of the present disclosure.

The foregoing limitation prohibits the occurrence of configurations in FIG. 6 and FIG. 7 (locations of X in FIG. 6 and FIG. 7 are locations at which resource reservation cannot be performed), to ensure a time interval between HARQ feedback-based retransmissions, and ensure that feedback corresponding to the two resources is transmitted in different slots.

Figure 8:
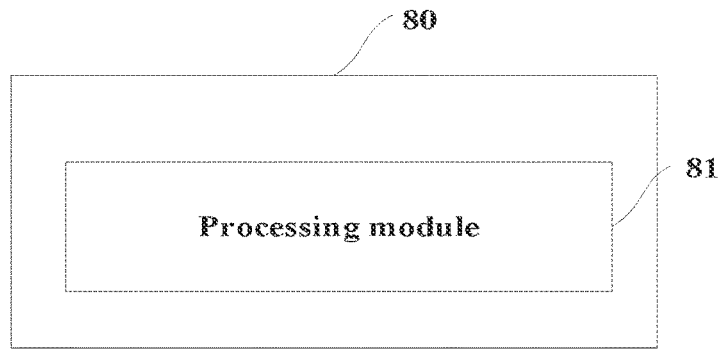
FIG. 8 is a schematic diagram of a structure of a terminal according to an embodiment of the present disclosure.

Referring to FIG. 8, an embodiment of the present disclosure further provides a terminal 80, including: a processing module 81, configured to: if a target SCI indicates resource reservation, perform resource reservation or resource sensing based on resource reservation rule information.

In some embodiments, the resource reservation rule information includes at least one of the following:
N, where N is a number of reserved resource times or a number of reserved time domain units; or
L, where L is a number of reserved resources or a number of reserved HARQ processes.

In some embodiments, a value of N is one of the following:
a first value, where the first value is a maximum number of transmission times of a TB, the maximum number of transmission times of the TB minus a number of transmission times that the TB has completed, or a maximum number of transmission times of the TB minus a number of resources that have been selected for the TB;
a second value, where the second value is a maximum quantity Nmax of resources that can be reserved by an SCI, or Nmax minus a number of remaining reserved resources; and
a smaller value in the first value and the second value; where
The TB is a TB scheduled by the target SCI.

In some embodiments, the value of N is set by a transmit terminal of the target SCI.

In some embodiments, the value of N is determined based on at least one of the following:
a predefined, preconfigured, or configured value;
a priority of the TB;
a channel occupation ratio of a resource pool configured for the terminal; or
a channel busy ratio of a resource pool configured for the terminal; where
the TB is a TB scheduled by the target SC.

In some embodiments, N is configured in the following manner:
each TB corresponds to respective N and/or L;
each terminal corresponds to respective N and/or L;
each priority corresponds to respective N and/or L;
each resource pool corresponds to respective N and/or L;
each logical channel corresponds to respective N and/or L; and
each logical channel group corresponds to respective N and/or L.

In some embodiments, blind retransmission and HARQ feedback-based retransmission respectively correspond to one value of N; or
a sum of a number of resource times or a number of time domain units reserved for blind retransmission and HARQ feedback-based retransmission is N.

In some embodiments, blind retransmission and HARQ feedback-based retransmission respectively correspond to one value of L; or
  a sum of a number of resources or a number of HARQ processes reserved for blind retransmission and HARQ feedback-based retransmission is L.

In some embodiments, a unit used by the quantity L of reserved resources is one of the following:
  subchannel;
  physical resource block;
  resource element;
  data rate; or
  data amount.

In some embodiments, the resource reservation rule information includes locations of reserved resources, and the locations of the reserved resources meet at least one of the following conditions:
  the reserved resources are located in M time domain units and are not in one time domain unit;
  when next transmission is selected, a reserved resource and a reserved resource before the reserved resource are located in M time domain units, and are not in one time domain unit;
  if periodic reservation is enabled, the reserved resources are within a resource reservation period of the TB;
  a time interval between resources reserved in two adjacent times is not less than Ml time domain units, or
  a maximum of one resource is selected from [n−Nl, n] for reservation, and selected resources are not adjacent.

For example, if a PSFCH period N_FB configured in a resource pool configured for the terminal is not zero, a maximum of one resource is selected in each [n−N_FB+2−a, n] for reservation by using a slot n in which a PSFCH is located as a reference, and selected resources are not adjacent, where N is a number of transmission reservation times or a number of reserved time domain units, and a is a slot length required by the terminal to process one TB and send a feedback. That is, Nl=N_FB+2−a.

In some embodiments, a value of Ml is one of the following:
  a time length corresponding to $T_{proc,\ 0}$;
  a time length corresponding to $T_{proc,\ 1}$;
  a time length corresponding to $T_{proc,\ 0}+T_{proc,\ 1}$; or
  a predefined, preconfigured, or configured value; where
  a unit of the time length is millisecond, slot, micro-slot, subframe, or frame.
  $T_{proc,\ 0}$ is related to detection time; and
  $T_{proc,\ 1}$ is related to packet sending preparation time.

In some embodiments, a value of a is one of the following:
  a predefined, preconfigured, or configured value; where
  a time length corresponding to $T_{proc,\ 0}$;
  a time length corresponding to $T_{proc,\ 1}$; or
  a time length corresponding to $T_{proc,\ 0}+T_{proc,\ 1}$; where
  a unit of the time length is millisecond, slot, micro-slot, subframe, or frame.
  $T_{proc,\ 0}$ is related to detection time; and
  $T_{proc,\ 1}$ is related to packet sending preparation time.

In some embodiments, the locations of the reserved resources are a resource in which the target SCI is located and K consecutive selected resources subsequent to the resource, and the selected resource(s) are resources selected by higher layers.

In some embodiments, a value of K is equal to min (Nmax−1, Number of resources in M time domain units); where
  Nmax is a maximum number of resources that can be reserved by an SCI.

In some embodiments, the resource reservation rule information includes one of the following:
  if the TB uses blind retransmission and/or HARQ feedback-based retransmission, a number of reserved resource times of the TB does not exceed N; or
  if the TB uses blind retransmission and/or HARQ feedback-based retransmission, the number of reserved resource times for the TB can exceed N; where
  N is a number of reserved resource times or a number of reserved time domain units.

In some embodiments, the performing resource reservation or resource sensing includes:
  triggering the terminal to reserve a resource or triggering the terminal to perform resource sensing if at least one of the following conditions is met:
  a number of reserved transmission times is less than N, where N is a number of reserved resource times or a number of reserved time domain units;
  a number of reserved resources is less than L, where L is a number of reserved resources or HARQ processes;
  a number of reserved transmission times is less than or equal to $N_{selection}$, where $N_{selection}$ is a transmission times threshold for triggering resource selection;
  a proportion of a number of reserved transmission times is less than or equal to a %;
  a number of reserved resources is less than $L_{selection}$, where $L_{selection}$ is a resource quantity threshold for triggering resource selection;
  a proportion of a number of reserved resources is less than or equal to b %;
  if the TB is still not successfully transmitted in time T before a moment of a (last but Ml−1)$^{th}$ selected resource;
  if whether the TB is successfully transmitted still cannot be determined in time T before a moment of a (last but Ml−1)$^{th}$ selected resource;
  if a number of reserved transmission times is less than N in time T before a moment of last Ml selected resources;
  if the last selected resource is transmitted but the TB is still not successfully transmitted;
  if the last selected resource is transmitted but whether the TB is successfully transmitted still cannot be determined; and
  if the last selected resource is transmitted and a number of reserved transmission times is less than N; where the TB is a TB scheduled by the target SCI.
  Ml is a value greater than or equal to 1 and less than N.

In some embodiments, any one or more of $N_{selection}$, a %, $L_{selection}$, b %, and Ml are predefined, preconfigured, or configured values.

The terminal provided in the embodiments of the present disclosure can implement processes implemented by the terminal in the method embodiments of FIG. 2 to FIG. 7. To avoid repetition, details are not described herein again.

Figure 9:
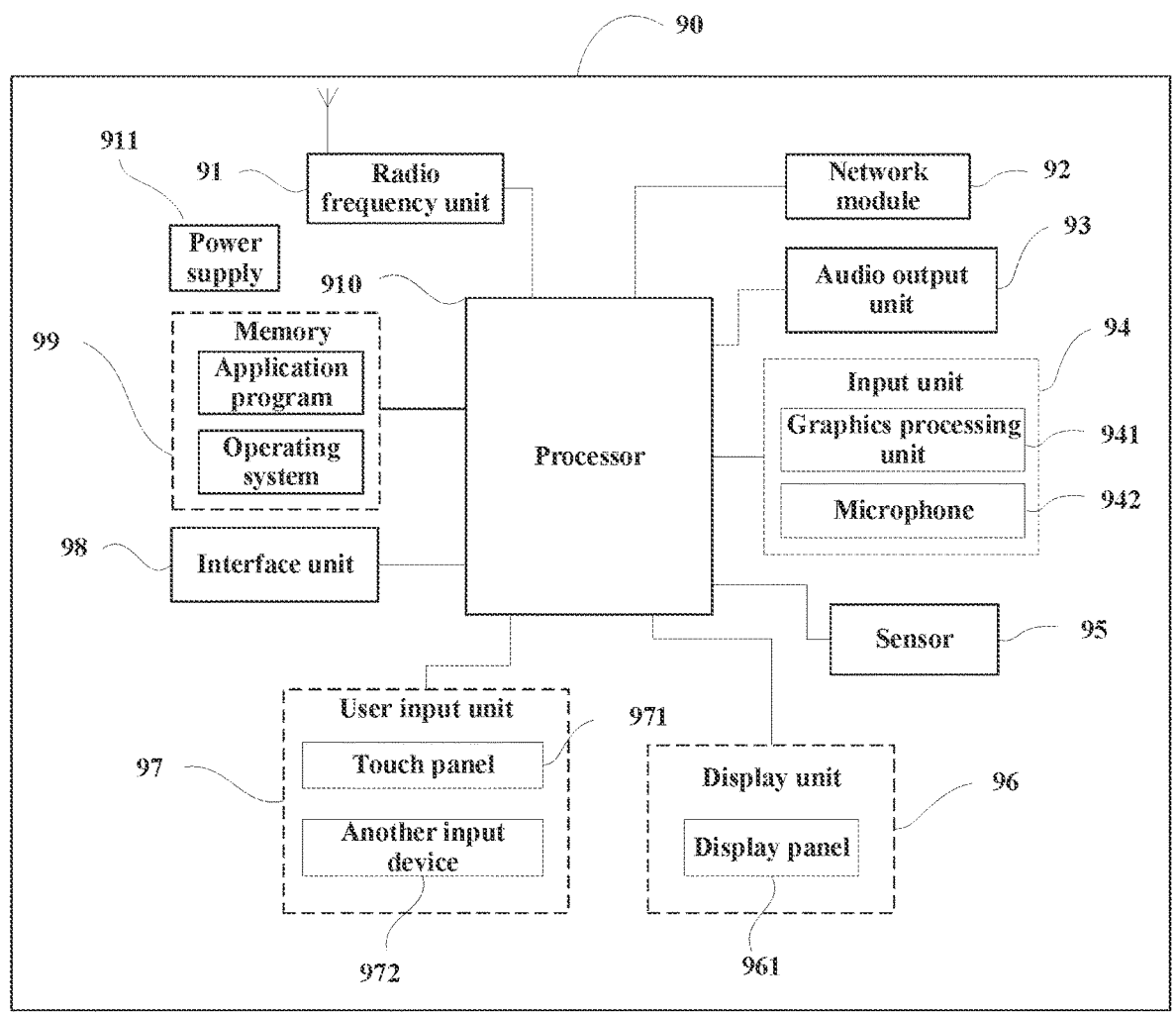
FIG. 9 is a schematic diagram of a structure of a terminal according to another embodiment of the present disclosure.

FIG. 9 is a schematic diagram of a hardware structure of a terminal for implementing embodiments of the present disclosure.

The terminal 90 includes but is not limited to components such as a radio frequency unit 91, a network module 92, an audio output unit 93, an input unit 94, a sensor 95, a display unit 96, a user input unit 97, an interface unit 98, a memory 99, a processor 910, and a power supply 911. A person skilled in the art may understand that a structure of the terminal shown in FIG. 9 does not constitute a limitation on the terminal, and the terminal may include more or fewer components than those shown in the figure, or combine some components, or have different component arrangements. In this embodiment of the present disclosure, the terminal includes but is not limited to a mobile phone, a tablet computer, a laptop computer, a palmtop computer, an in-vehicle terminal, a wearable device, a pedometer, and the like.

The processor 910 is configured to: if a target SCI indicates resource reservation, perform resource reservation or resource sensing based on resource reservation rule information.

In this embodiment of the present disclosure, the terminal can keep consistent understanding of information based on the reservation resource rule information, and perform resource reservation or resource sensing, so that when selecting a resource, another terminal can accurately rule out a reserved resource, thereby avoiding a problem of a resource collision, so that data transmission reliability of the terminal can be improved.

It should be understood that, in this embodiment of the present disclosure, the radio frequency unit 91 may be configured to receive and send information or receive and send a signal in a call process. Specifically, after downlink data from a base station is received, the processor 910 processes the downlink data. In addition, uplink data is sent to the base station. Generally, the radio frequency unit 91 includes but is not limited to an antenna, at least one amplifier, a transceiver, a coupler, a low noise amplifier, a duplexer, and the like. In addition, the radio frequency unit 91 may further communicate with a network and another device by using a wireless communication system.

The terminal provides wireless broadband Internet access for the user by using the network module 92, for example, helping the user send and receive an email, browsing a web page, and accessing streaming media.

The audio output unit 93 may convert audio data received by the radio frequency unit 91 or the network module 92 or stored in the memory 99 into an audio signal and output as sound. In addition, the audio output unit 93 may further provide audio output (for example, call signal receiving sound or message receiving sound) related to a specific function performed by the terminal 90. The audio output unit 93 includes a loudspeaker, a buzzer, a telephone receiver, and the like.

The input unit 94 is configured to receive an audio or video signal. The input unit 94 may include a Graphics Processing Unit (GPU) 941 and a microphone 942. The graphics processing unit 941 processes image data of a static picture or a video obtained by an image capture apparatus (such as a camera) in a video capture mode or an image capture mode. A processed image frame may be displayed on the display unit 96. The image frame processed by the graphics processing unit 941 may be stored in the memory 99 (or another storage medium) or sent by using the radio frequency unit 91 or the network module 92. The microphone 942 may receive sound and can process such sound into audio data. The processed audio data may be output by being converted into a format that may be sent to a mobile communications base station by using the radio frequency unit 91 in a telephone call mode.

The terminal 90 further includes at least one sensor 95, such as an optical sensor, a motion sensor, and another sensor. Specifically, the optical sensor includes an ambient light sensor and a proximity sensor. The ambient light sensor may adjust luminance of the display panel 961 based on brightness of ambient light, and the proximity sensor may disable the display panel 961 and/or backlight when the terminal 90 approaches an ear. As a type of the motion sensor, an accelerometer sensor may detect magnitude of an acceleration in each direction (generally three axes), and may detect magnitude and a direction of gravity when being static. The accelerometer sensor may be used for recognizing a terminal gesture (for example, horizontal and vertical screen switching, a related game, or magnetometer posture calibration), a function related to vibration recognition (for example, a pedometer or a strike), or the like. The sensor 95 may further include a fingerprint sensor, a pressure sensor, an iris sensor, a molecular sensor, a gyroscope, a barometer, a hygrometer, a thermometer, an infrared sensor, and the like. This is not described herein.

The display unit 96 is configured to display information entered by the user or information provided for the user. The display unit 96 may include a display panel 961, and the display panel 961 may be configured in a form of a Liquid Crystal Display (LCD), an Organic Light-Emitting Diode (OLED), or the like.

The user input unit 97 may be configured to receive input digit or character information and generate key signal input related to user setting and function control of the terminal. Specifically, the user input unit 97 includes a touch panel 971 and another input device 972. The touch panel 971, also referred to as a touchscreen, may collect a touch operation performed by the user on or near the touch panel 971 (for example, an operation performed by the user on or near the touch panel 971 by using any suitable object or accessory such as a finger or a stylus). The touch panel 971 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, sends the contact coordinates to the processor 910, and can receive and execute a command sent by the processor 910. In addition, the touch panel 971 may be implemented by using multiple types such as a resistive type, a capacitive type, an infrared ray, and a surface acoustic wave. The user input unit 97 may include another input device 972 in addition to the touch panel 971. Specifically, the another input device 972 may include but is not limited to one or more of a physical keyboard, a function key (such as a volume control key or an on/off key), a trackball, a mouse, a joystick, and the like. Details are not described herein.

Further, the touch panel 971 may cover the display panel 961. After detecting the touch operation on or near the touch panel 971, the touch panel 961 transmits the touch operation to the processor 910 to determine a type of a touch event, and then the processor 910 provides corresponding visual output on the display panel 961 based on the type of the touch event. In FIG. 9, the touch panel 971 and the display panel 961 are used as two independent components to implement input and output functions of the terminal. However, in some embodiments, the touch panel 971 and the display panel 961 may be integrated to implement the input and output functions of the terminal. This is not specifically limited herein.

The interface unit 98 is an interface connecting an external apparatus to the terminal 90. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 98 may be configured to receive input (for example, data information and power) from the external apparatus and transmit the received input to one or more elements in the terminal 90, or may be configured to transmit data between the terminal 90 and the external apparatus.

The memory 99 may be configured to store a software program and various data. The memory 99 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 99 may include a high-speed random access memory, and may further include a non-volatile memory such as at least one magnetic disk storage component, a flash memory component, or another volatile solid-state storage component.

The processor 910 is a control center of the terminal, and is connected to all parts of the entire terminal by using various interfaces and lines, and performs various functions of the terminal and processes data by running or executing the software program and/or the module that are stored in the memory 99 and invoking the data stored in the memory 99, to implement overall monitoring on the terminal. The processor 910 may include one or more processing units. The processor 910 may be integrated with an application processor and a modem processor. The application processor mainly processes an operating system, a user interface, an application program, and the like, and the modem processor mainly processes wireless communication. It may be understood that the modem processor may also not be integrated into the processor 910.

The terminal 90 may further include a power supply 911 (such as a battery) that supplies power to each component. The power supply 911 may be logically connected to the processor 910 by using a power management system, to implement functions such as charging, discharging, and power consumption management by using the power management system.

In addition, the terminal 90 includes some function modules not shown, and details are not described herein.

Figure 10:
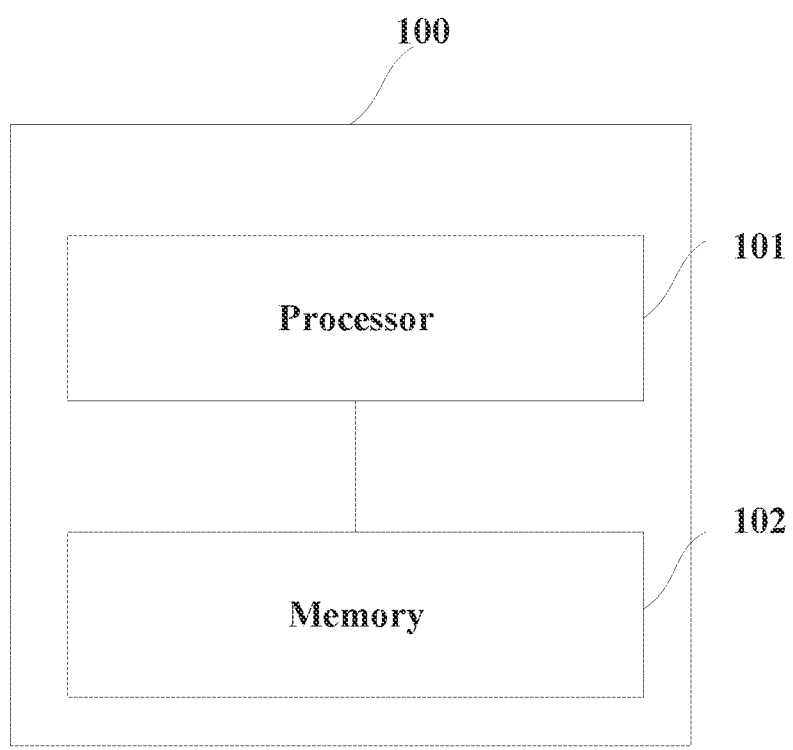
FIG. 10 is a schematic diagram of a structure of a terminal according to still another embodiment of the present disclosure.

Refer to FIG. 10. An embodiment of the present disclosure further provides a terminal 100, including a processor 101, a memory 102, and a computer program that is stored in the memory 102 and that can run on the processor 101. When the computer program is executed by the processor 101, each process of the foregoing resource selection method embodiments can be implemented, and a same technical effect can be achieved. To avoid repetition, details are not described herein.

An embodiment of the present disclosure further provides a computer-readable storage medium. A computer program is stored in the computer-readable storage medium. When being executed by a processor, processes of the foregoing resource selection method embodiments can be implemented, and a same technical effect can be achieved. To avoid repetition, details are not described herein. The computer-readable storage medium includes a Read-Only Memory (ROM), a Random Access Memory (RAM), a magnetic disk, an optical disc, or the like.

It should be noted that in this specification, the term "include", "including", or any other variant is intended to cover non-exclusive inclusion, so that a process, method, article, or apparatus that includes a series of elements includes not only those elements but also other elements that are not explicitly listed, or includes elements inherent to such a process, method, article, or apparatus. In the absence of more restrictions, an element defined by the statement "including a . . . " does not exclude another same element in a process, method, article, or apparatus that includes the element.

According to the descriptions of the foregoing implementations, a person skilled in the art may clearly understand that the foregoing method embodiments may be implemented by using software and a required universal hardware platform, or may be implemented by using hardware. Based on such an understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to execute the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

What is claimed is:

1. A method for resource selection, performed by a terminal, comprising:
when target sidelink control information (SCI) indicates resource reservation, performing the resource reservation or resource sensing based on resource reservation rule information,
wherein the resource reservation rule information comprises locations of reserved resources,
wherein the locations of the reserved resources are N2 resources, the N2 resources comprise a resource where the target SCI is located and N2-1 consecutive selected resources thereafter, and the selected resources are resources selected by a higher layer, and
wherein a value of N2 is equal to min (Nmax, a number of resources in M time domain units+1), Nmax is a maximum number of resources that is reserved by one SCI.

2. The method according to claim 1, wherein the resource reservation rule information comprises at least one of the following:
N, wherein N is a number of reserved resource times or a number of reserved time domain units; or
L, wherein L is a number of reserved resources or a number of reserved hybrid automatic repeat request (HARQ) processes.

3. The method according to claim 2, wherein a value of N is at least one of the following:
a first value, wherein the first value is a maximum number of transmission times of a transport block (TB), the maximum number of transmission times of the TB minus a number of transmission times that the TB has completed, or a maximum number of transmission times of the TB minus a number of resources that have been selected for the TB;

a second value, wherein the second value is a maximum quantity Nmax of resources that can be reserved by an SCI, or Nmax minus a number of remaining reserved resources; or a smaller value in the first value and the second value; wherein the TB is a TB scheduled by the target SCI.

4. The method according to claim 3, wherein the value of N is set by a transmit terminal of the target SCI.

5. The method according to claim 2, wherein values of N or L are predefined, preconfigured, or configured values.

6. The method according to claim 5, wherein N or L is configured in the following manner:
   each TB corresponds to respective N or L;
   each terminal corresponds to respective N or L;
   each priority corresponds to respective N or L;
   each resource pool corresponds to respective N or L;
   each channel occupation ratio corresponds to respective N or L;
   each channel busy ratio corresponds to respective N or L;
   each logical channel corresponds to respective N or L; and
   each logical channel group corresponds to respective N or L.

7. The method according to claim 2, wherein:
   blind retransmission and HARQ feedback-based retransmission respectively correspond to one value of N; or
   a sum of a number of resource times or a number of time domain units reserved for the blind retransmission and HARQ feedback-based retransmission is N.

8. The method according to claim 2, wherein:
   blind retransmission and HARQ feedback-based retransmission respectively correspond to one value of L; or
   a sum of a number of resources or a number of HARQ processes reserved for the blind retransmission and HARQ-based retransmission is L.

9. The method according to claim 1, wherein a unit used by a quantity L of reserved resources is one of the following:
   subchannel;
   physical resource block;
   resource element;
   data rate; or
   data amount.

10. The method according to claim 1, wherein the locations of the reserved resources meet at least one of the following conditions:
    the reserved resources are located in the M time domain units but are not in a same time domain unit;
    when next transmission is selected, a reserved resource and a reserved resource before the reserved resource are located in the M time domain units, and are not in the same time domain unit;
    when periodic reservation is enabled, the reserved resources are within a resource reservation period of a transport block (TB);
    a time interval between resources reserved in two adjacent times is not less than M1 time domain units; or
    a maximum of one resource is selected from [n−N1, n] for reservation, and selected resources are not adjacent, wherein N1=N_FB+2−a, N_FB is a period of a physical sidelink feedback channel (PSFCH) configured in a resource pool configured for the terminal, n is a time slot in which the PSFCH is located, and a is a slot length required by the terminal to process one TB and send a feedback.

11. The method according to claim 10, wherein a value of M1 is at least one of the following:
    a time length corresponding to $T_{proc, 0}$;
    a time length corresponding to $T_{proc, 1}$;
    a time length corresponding to $T_{proc, 0}+T_{proc, 1}$; and
    a predefined, preconfigured, or configured value; wherein
    a unit of the time length is millisecond, slot, micro-slot, subframe, or frame;
    $T_{proc, 0}$ is related to detection time; or
    $T_{proc, 1}$ is related to packet sending preparation time.

12. The method according to claim 1, wherein the performing resource reservation or resource sensing comprises:
    triggering the terminal to reserve a resource or triggering the terminal to perform the resource sensing when at least one of the following conditions is met:
    a number of reserved transmission times is less than N, wherein N is a number of reserved resource times or a number of reserved time domain units;
    a number of reserved resources is less than L, wherein L is a number of HARQ processes;
    the number of reserved transmission times is less than or equal to $N_{selection}$, wherein $N_{selection}$ is a transmission times threshold for triggering resource selection;
    a proportion of the number of reserved transmission times is less than or equal to a %;
    the number of reserved resources is less than $L_{selection}$, wherein $L_{selection}$ is a resource quantity threshold for triggering the resource selection;
    a proportion of the number of reserved resources is less than or equal to b %;
    when a transport block (TB) is still not successfully transmitted in time T before a moment of a (last but M1-1)$^{th}$ selected resource;
    when whether the TB is successfully transmitted still cannot be determined in the time T before the moment of the (last but M1-1)$^{th}$ selected resource;
    when the number of reserved transmission times is less than N in time T before a moment of last M1 selected resources;
    when the last selected resource is transmitted but the TB is still not successfully transmitted;
    when the last selected resource is transmitted but whether the TB is successfully transmitted still cannot be determined; or
    when the last selected resource is transmitted and the number of reserved transmission times is less than N; wherein:
    the TB is a TB scheduled by the target SCI; and
    M1 is a value greater than or equal to 1 and less than N.

13. The method according to claim 12, wherein any one or more of $N_{selection}$, a %, $L_{selection}$, b %, M1 are predefined, preconfigured, or configured values.

14. A terminal, comprising: a memory storing a computer program; and a processor coupled to the memory and configured to execute the computer program to perform a method for resource selection, the method comprising:
    when target sidelink control information (SCI) indicates resource reservation, performing the resource reservation or resource sensing based on resource reservation rule information,
    wherein the resource reservation rule information comprises locations of reserved resources,
    wherein the locations of the reserved resources are N2 resources, the N2 resources comprise a resource where the target SCI is located and N2-1 consecutive selected resources thereafter, and the selected resources are resources selected by a higher layer, and wherein a value of N2 is equal to min (Nmax, a number of resources in M time domain units+1), Nmax is a maximum number of resources that is reserved by one SCI.

15. The terminal according to claim 14, wherein the resource reservation rule information comprises at least one of the following:
   N, wherein N is a number of reserved resource times or a number of reserved time domain units; or
   L, wherein L is a number of reserved resources or a number of reserved hybrid automatic repeat request (HARQ) processes.

16. The terminal according to claim 15, wherein a value of N is at least one of the following:
   a first value, wherein the first value is a maximum number of transmission times of a transport block (TB), the maximum number of transmission times of the TB minus a number of transmission times that the TB has completed, or a maximum number of transmission times of the TB minus a number of resources that have been selected for the TB;
   a second value, wherein the second value is a maximum quantity Nmax of resources that can be reserved by an SCI, or Nmax minus a number of remaining reserved resources; or
   a smaller value in the first value and the second value;
   wherein the TB is a TB scheduled by the target SCI.

17. The terminal according to claim 14, wherein the locations of the reserved resources meet at least one of the following conditions:
   the reserved resources are located in the M time domain units but are not in a same time domain unit;
   when next transmission is selected, a reserved resource and a reserved resource before the reserved resource are located in the M time domain units, and are not in the same time domain unit;
   when periodic reservation is enabled, the reserved resources are within a resource reservation period of a transport block (TB);
   a time interval between resources reserved in two adjacent times is not less than M1 time domain units; or
   a maximum of one resource is selected from [n−N1, n] for reservation, and selected resources are not adjacent, wherein N1=N_FB+2−a, N_FB is a period of a physical sidelink feedback channel (PSFCH) configured in a resource pool configured for the terminal, n is a time slot in which the PSFCH is located, and a is a slot length required by the terminal to process one TB and send a feedback.

18. A non-transitory computer-readable storage medium, storing a computer program, when the computer program is executed by a processor, performs a method for resource selection, the method comprising:
   when target sidelink control information (SCI) indicates resource reservation, performing the resource reservation or resource sensing based on resource reservation rule information,
   wherein the resource reservation rule information comprises locations of reserved resources,
      wherein the locations of the reserved resources are N2 resources, the N2 resources comprise a resource where the target SCI is located and N2-1 consecutive selected resources thereafter, and the selected resources are resources selected by a higher layer, and
      wherein a value of N2 is equal to min (Nmax, a number of resources in M time domain units+1), Nmax is a maximum number of resources that can be reserved by one SCI.

* * * * *